United States Patent
Smith

(10) Patent No.: US 6,743,879 B1
(45) Date of Patent: Jun. 1, 2004

(54) METHACRYLIC-URETHANE OLIGOMERS, METHOD OF PREPARATION AND OLIGOMER-CONTAINING RESIN COMPOSITIONS

(75) Inventor: Stuart B. Smith, Conyers, GA (US)

(73) Assignee: Hehr International Inc., Los Angeles, CA (US)

( * ) Notice: Subject to any disclaimer, the term of this patent is extended or adjusted under 35 U.S.C. 154(b) by 0 days.

(21) Appl. No.: 09/526,761

(22) Filed: Mar. 16, 2000

Related U.S. Application Data

(63) Continuation-in-part of application No. 09/515,468, filed on Feb. 29, 2000, now abandoned, which is a continuation of application No. 09/046,450, filed on Mar. 23, 1998, now Pat. No. 6,031,046, which is a division of application No. 08/745,445, filed on Nov. 12, 1996, now Pat. No. 5,741,872, which is a continuation-in-part of application No. 08/629,894, filed on Apr. 10, 1996, now Pat. No. 5,739,240.

(51) Int. Cl.[7] ............................................. C08F 126/02
(52) U.S. Cl. ........................................ 526/301; 525/123
(58) Field of Search .......................................... 526/301

(56) References Cited

U.S. PATENT DOCUMENTS 5,322,861 A * 6/1994 Tsuge et al. .................. 522/90
5,736,090 A * 4/1998 Yamamoto et al. ......... 264/255

FOREIGN PATENT DOCUMENTS

JP          40-1016817      *  1/1989

* cited by examiner

*Primary Examiner*—Bernard Lipman
(74) *Attorney, Agent, or Firm*—Leslie Meyer-Leon, Esq.; IP Legal Strategies Group P.C.

(57) ABSTRACT

Low viscosity methacrylic-urethane oligomers useful as a styrene monomer substitute in unsaturated resin compositions, are prepared by reacting a hydroxy ethyl or propyl methyl methacrylate monomer with an elastomeric urethane prepolymer having free NCO groups.

13 Claims, No Drawings

METHACRYLIC-URETHANE OLIGOMERS, METHOD OF PREPARATION AND OLIGOMER-CONTAINING RESIN COMPOSITIONS

REFERENCE TO PRIOR APPLICATIONS

This application is a continuation-in-part of U.S. patent application Ser. No. 09/515,468, filed Feb. 29, 2000, now abandoned, which is a continuation of U.S. patent application Ser. No. 09/046,450, filed Mar. 23, 1998, now U.S. Pat. No. 6,031,046, issued Feb. 29, 2000, which is a divisional application of U.S. patent application Ser. No. 08/745,445, filed Nov. 12, 1996, now U.S. Pat. No. 5,741,872, issued Apr. 21, 1998, which is a continuation-in-part application of U.S. patent application Ser. No. 08/629,894, filed Apr. 10, 1996, now U.S. Pat. No. 5,739,240, issued Apr. 14, 1998, all hereby incorporated by reference.

BACKGROUND OF THE INVENTION

Unsaturated resin compositions typically have used styrene monomers, like styrene as a reactive diluent, to adjust and reduce the viscosity of the resin compositions, generally in amount of up to 50% by weight, e.g., 5 to 40%. The unsaturated resin compositions include unsaturated polyester resin compositions prepared by the reaction of unsaturated acids with alcohols, such as dicarboxylic acids and dihydroxy alcohols.

Ethylenic unsaturation is usually realized by the use of maleic and fumaric acids or anhydrides; however, such compositions may also contain saturated acids, like phthalic and adipic acids to adjust resin properties. The dihydroxy alcohols used in the preparation may include: ethylene; propylene; diethylene; dipropylene glycols; and neopentyl glycol. These resin compositions contain cross-linking agents, like styrene and diallyl phthalate, and are peroxide curable to provide thermosetting resins.

The vinyl ester resin compositions comprise the vinyl esters of various acids, typically, short chain aliphatic and dicyclic acids, like $C_2$–$C_6$ acids, such as acetic acid. These vinyl ester resin compositions, such as polyvinyl acetate, contain cross-linking agents and styrene monomers and are subject to peroxide cure to produce a thermosetting vinyl ester resin.

While the use of styrene monomers provides a satisfactory product, the Environmental Protection Agency (EPA) requires that such cross-linkable resin compositions meet EPA regulations for volatile organic compounds (VOC).

The search for styrene monomer substitutes to meet VOC regulations is directed to low VOC compounds which are not flammable. Such substitutes are usually limited to: acrylic monomers; oligomers; methyl methacrylates; and allyl alcohol ethers. However, the acrylic monomers are usually associated with strong odor, low viscosity, strong skin irritation, and slow peroxide cure.

Acrylic oligomers are typically too high in viscosity and do not lend themselves to reduction in viscosity like the styrene monomers do. The allyl alcohol compounds tend to be very slow curing, and like the acrylics, are inhibited by air to cure with peroxides. Further, methyl methacrylate monomers are classified, like styrene monomers, by the EPA and have a strong objectionable odor.

It is desirable to provide a substitute for styrene monomers in resin compositions, which substitute provides a reactive diluent which overcomes the prior objections of other proposed prior art substitutes.

SUMMARY OF THE INVENTION

The invention relates to methyl methacrylate-urethane oligomers, the method of preparation of the same, polymers produced therefrom, and resin compositions wherein the oligomers are employed in whole or in part as styrene monomer substitutes.

The invention comprises a low viscosity methyl methacrylic-urethane oligomer prepared by the reaction of a hydroxyalkyl methacrylate monomer with an elastomeric urethane prepolymer having free NCO groups, and the oligomer is typically characterized by a viscosity of less than about 500 centipoise (cP).

The invention relates to a polymer prepared by the polymerization of the oligomer, typically by peroxide cure, free radical cure, or radiation cure of the oligomer alone or with other monomers or oligomers. The invention also comprises a low viscosity alkyl methacrylic-urethane oligomer prepared by the reaction of and in the presence of a catalyst of a hydroxyl ethyl or hydroxyl propyl methacrylate monomer with a flexible elastomeric urethane prepolymer, and generally having about 5 to 15% free NCO groups in about a stoichiometric amount or very minor excess of 0.1 to 0.2%, or in an excess of the methacrylate monomer, such as up to about 2 to 5 percent.

While the oligomer may be prepared with an excess of free NCO groups, the reaction preparation is not preferred, since the free NCO groups in the oligomer tend to react with moisture in the air and to cause foaming of the oligomer. The preferred reaction is to employ a stoichiometric amount or a slight excess of the methyl methacrylate monomer.

The resin composition, with the oligomer, may include: stabilizers; catalysts; promoters; curing agents; various filler materials; and other additives and components used in and with oligomers and resin compositions to prepare oligomer resin compositions suitable for use as: paint coatings; industrial floor coatings; gel coat replacement in laminates, such as rigid urethane foam-polyester composite laminate structures; marble coatings; and/or other industrial applications.

It has been discovered that the oligomers of the invention are characterized by low viscosity, such as less than 500 cP at 25° C., and preferably, less than 200 cP, e.g., about 100 cP and are suitable as styrene monomer substitutes in resin compositions, without sacrifice time or properties, and most important, the oligomers reduce VOC's to lower and acceptable levels.

The oligomers may be used in whole or in part as styrene monomer substitutes and may be used alone or with styrene monomers or other polymerizable monomers.

The oligomers, particularly those aliphatic or alicyclic urethane oligomers, may be used to produce UV stable coatings and polymers without VOC's for a number of novel and useful applications.

The hydroxyalkyl methacrylates employed are preferably: hydroxyethyl methacrylate (HEMA); hydroxypropyl methacrylate (HPMA); or mixtures thereof. The hydroxymethyl methacrylate (HEMA), when used by itself, produces a brittle polymer which can still be a skin irritant, and HEMA is also quite sensitive to air inhibition.

The oligomers of the invention are low viscosity oligomers and may be employed as a reactive diluent, i.e., as a styrene or methyl methacrylate monomer substitute with unsaturated resin compositions, generally peroxide-curable resin compositions in amounts of 5 to 90% by weight, such as about 10 to 30% by weight.

The oligomers are prepared generally in the presence of a catalyst, and optionally but preferably, in the presence of a promoter to provide the methyl methacrylate urethane oligomers. The catalyst and promoter materials and amounts used may vary but organo-metallic catalyst, such a tin salts as a catalyst, and cobalt salts, like DMAA and DMA and various amines as promoters are satisfactory.

The reactants are mixed and heated, e.g., 120 to 180° F., for a time of about 2 to 8 hours. The reactants may be used in varying amounts, but generally in about stoichiometric amounts. It is desirable to add a stabilizer or inhibitor to the reaction mixture to stabilize and prevent premature polymerization of the resulting oligomer, such as quinones and hydroquinones and derivatives.

The oligomers are cross-linkable with other monomers, such as in the resin composition or by itself, by the use of organic peroxides and promoters, like methyl ethyl ketone peroxide (MEKP), benzyl peroxide with amine promoters, like dimethylamine (DMA), diethylamine, and diethanolamine (DEA).

The solution and preparation of the elastomeric urethane prepolymer is important, due to the normal brittle nature of the methyl methacrylate monomers used in the reaction. The urethane prepolymer should be an elastomeric flexible prepolymer with free NCO groups for reaction with the selected amount of the methyl methacrylate monomer, generally greater than 50% by weight of the methyl methacrylate, e.g., 70 to 80% by weight with a prepolymer of 8 to 12% free NCO groups.

The elastomeric urethane prepolymers may be prepared with aromatic, aliphatic, or alicyclic polyisocyanates, typically diisocyanates reacted with polyols or amines which produce elastomeric urethanes.

Elastomeric urethane prepolymers, with about 10% free NCO for the best results, may be prepared employing primary linear diols and triols to include ethylene:oxide capped diols and triols, as well as linear polyesters and polyesters with free hydroxyl groups and aliphatic amines. Suitable polyisocyanates to prepare the prepolymers include: NCO uretedimine MDI; aliphatic dimer NCO; and isophorone diisocyante. Aliphatic urethane oligomers of low viscosity, e.g., 100 to 500 cP, are prepared from aliphatic diisocyanates and aliphatic amines of about 2000 MW and 5 to 10 NCO groups with HEM or HPMA in the presence of a tin catalyst and inhibitor.

The oligomer and oligomer resin composition may contain varying amounts of filler material, such as, but not limited to 5 to 50% by weight of: glass fibers; stone dust; calcium carbonate; metal oxides; and flame retardants, like aluminum trihydrites to provide marble-simulated resin coatings.

The oligomer of the invention may be schematically represented generally by the formula:

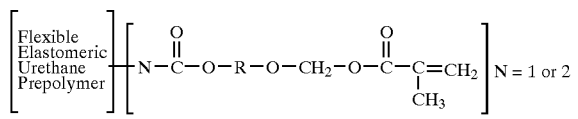

wherein R is an alkyl radical, such as $C_2$–$C_4$, such as a ethyl or propyl, the oligomer having a molecular weight of less than about 5000 and greater than 1200.

The invention will be described for the purpose of illustration only in connection with certain preferred embodiments; however, it is recognized that those persons skilled in the art may make various changes, additions, modifications and improvements in the formulations without departing from the spirit and scope of the invention.

DESCRIPTION OF THE EMBODIMENTS

EXAMPLE 1

An aromatic urethane prepolymer was prepared by the reaction of 55% by weight of a primary diol MW 4000 Hydroxyl No. 28 (Poly-G® 5528 or also suitable Poly-G® 55-112) with 45% by weight of a 20% NCO Uretedimine MDI (143L) at 150° F. for 4 hours to provide a 10% NCO urethane prepolymer. HEMA was reacted at 75%/25% HEMA/prepolymer with a tin catalyst (UL22) at 150° F. for 4 hours with 800 ppm MEHQ added as a stabilizer to prevent any change in viscosity for up to 6 months. The aromatic urethane oligomer produced (HP 1515) had the following specifications:

| | |
|---|---|
| Viscosity at 25° C. | 100 cP |
| Color, Gardner | 3 max |
| Density lbs./gal. | 9.2 |
| % free isocyanates | 0.1% max |
| Water content | 0.1% max |
| Acid content | 1.35% max |
| Solids | 100% |
| Flash point | 220° F. |

EXAMPLE 2

An aliphatic urethane prepolymer was prepared by the reaction of 50% by weight of an aliphatic amine (D2000 Jeffamine) with 50% by weight of an aliphatic dimer NCO 22% (Desmodur N 3400) to produce a 10% NCO aliphatic urethane prepolymer. The preparation of aliphatic prepolymers with amines is advantageous, since the polymerization reaction may be carried out without heating. Other suitable diisocyanates that may be employed include Desmodur I.

The aliphatic prepolymer was reacted with 66-⅔% HEMA (or HPMA) to 33-⅓% of the prepolymer in the presence of a tin catalyst (UL22) and a stabilizer (MEHQ) for 4 hours at 150° F. to provide a aliphatic methyl methacrylate-urethane oligomer (HP 1516) with the following specifications:

| | |
|---|---|
| Viscosity at 25° C. | 100 cP |
| Color, Gardner | 2 max |
| Density lbs./gal. | 9.1 |
| % free isocyanates | 0.1% max |
| Water content | 0.1% max |
| Acid content | 1.25% max |
| Solids | 100% |
| Flash point | 220° F. |

The oligomers prepared were added to various unsaturated polyester resin compositions in amounts of 25 to 75% as a styrene or methyl methacrylate monomer substitute with standard promoters (cobalt actuate 12%) and DMAA or DMA used as well as 9% peroxides like MEKP as follows:

TABLE I

Typical characteristics for HP 1515 and HP 1516 With Unsaturated Polyesters

| | NPG-ISO | 25% 1516 | 50% 1516 | 75% 1516 |
|---|---|---|---|---|
| Viscosity, cPs | 4200 cPs | 2100 cPs | 1360 cPs | 880 cps |

TABLE I-continued

Typical characteristics for HP 1515 and HP 1516
With Unsaturated Polyesters

| Styrene content | 32% | 24% | 16% | 8% |
|---|---|---|---|---|
| Solids | 68% | 76% | 84% | 92% |
| Gel time* | 9.0 min | 8.6 min | 8.0 min | 7.0 min |

*2% MEKP (NORAC 925) 0.15% Cobalt 12%, 1% DMAA

| P.G Ortho | 25% 1516 | 50% 1516 | 75% 1516 |
|---|---|---|---|
| Viscosity, cPs | 3800 cPs | 1550 cPs | 840 cPs | 600 cps |
| Styrene content | 26% | 19.5% | 13% | 6.5% |
| Solids, % | 74% | 81.5% | 87% | 93.5% |
| Gel time | 6.0 min | 5.8 min | 5.5 min | 5.0 min |

| Epoxy Vinyl Ester | 25% 1516 | 50% 1516 | 75% 1516 |
|---|---|---|---|
| Viscosity, cPs | 1150 cPs | 500 cPs | 400 cPs | 360 cps |
| Styrene content | 35% | 26.25% | 17.5% | 8.75% |
| Solids, % | 65% | 73.75% | 82.5% | 91.25% |
| Gel time | 8.0 min | 7.5 min | 7.2 min | 7.0 min |

| DCPD | 25% 1516 | 50% 1516 | 75% 1516 |
|---|---|---|---|
| Viscosity, cPs | 2650 cPs | 1420 cPs | 1020 cPs | 700 cPs |
| Styrene content | 26% | 19.5% | 13% | 6.5% |
| Solids, % | 74% | 80.5% | 87% | 93.5% |
| Gel time | 5.0 min | 5.0 min | 5.0 min | 5.0 min |

|  | 1516 (aliphatic) | 1515 (aromatic) |
|---|---|---|
| Viscosity, cPs | 100 cPs | 100 cPs |
| Styrene content | 0 | 0 |
| Solids, % | 100% | 100% |
| Gel time | 7.0 min | 8.0 min |

Abbreviations employed are described in the following Table:

TABLE II

| UL22 | a trademark of Witco Corp. and an organic tin catalyst |
|---|---|
| D2000 Jeffamine | a trademark of Huntsman Chemical Co. for a 2000 MW primary polyoxyethylene amine diol |
| MEHQ | methyl ethyl hydroquinone inhibitor-stabilizer |
| Poly-G ® 5528 | a trademark of Arch Chemicals, Inc. for a primary diol |
| Poly-G ® 55-112 | a trademark of Arch Chemicals, Inc. for ethylene oxide capped diol polyester polyol MW 1000 Hydroxyl No. 112 |
| Desmodur I also | a trademark of the Bayer Corporation for liquid cycloaliphatic diisocyanate, and is known as 3-isocyanatomethyl-3,5,5-trimethylcyclohexyl isocyanate or IPDI |
| Desmodur N 3400 | a trademark of the Bayer Corporation for low viscosity solvent-free aliphatic polyisocyanate resin base on hexamethylene diisocyanate (HDI) |
| 143 L | a trademark of Dow Chemical and a uretedimine MDI polyisocyanate with free NCO groups |
| NPG-ISO | polyester resin of neopentyl glycol and isophthalate |
| DCPD | polyester resin of dicyclopentadiene |
| PG Ortho | polyester resin of polypropylene glycol and orthophthalate |

What is claimed is:

1. A low viscosity methacrylic-urethane oligomer prepared by the reaction of a hydroxyalkyl methacrylate monomer with an elastomeric aliphatic prepolymer having free NCO groups, wherein the prepolymer is prepared by the reaction of an aliphatic or cycloaliphatic diisocyanate dimer and an aliphatic amine.

2. The oligomer of claim 1 wherein the viscosity is less than about 500 cP.

3. The oligomer of claim 1 wherein the monomer is selected from the group consisting of: hydroxy ethyl methacrylate, hydroxy propyl methacrylate, and combinations thereof.

4. The oligomer of claim 1 wherein the reaction is carried out in about a stoichiometric amount or an excess of up to about 2 percent by weight of the monomer.

5. The oligomer of claim 1 wherein the reaction is carried out in the presence of a catalyst.

6. The oligomer of claim 1 which includes a stabilizing amount of a polymerization inhibitor.

7. A polymer prepared by the polymerization of the oligomer of claim 1.

8. The polymer of claim 7 which includes a filler material.

9. The oligomer of claim 1 wherein the prepolymer has about 5 to 15 percent NCO groups.

10. A low viscosity methacrylic-urethane oligomer prepared by the reaction in the presence of a catalyst of a hydroxyl ethyl or hydroxyl propyl methacrylate monomer with a flexible elastomeric aliphatic prepolymer having about 8 to 12 percent free NCO groups in about a stoichiometric amount or in an excess of the monomer, the oligomer having a viscosity of less than about 500 cP, wherein the flexible elastomeric aliphatic prepolymer is prepared by the reaction of an aliphatic or cycloaliphatic diisocyanate dimer and an aliphatic amine.

11. The oligomer of claim 1, wherein the aliphatic prepolymer is an aliphatic dimer polyisocyanate.

12. The oligomer of claim 11, wherein the aliphatic dimer polyisocyanate is hexamethylene diisocyanate dimer.

13. The oligomer of claim 12, wherein the hexamethylene diisocyanate dimer is Desmodur N-3400.

* * * * *